J. F. ZIMMERMAN.
MACHINE FOR PAINTING TIRE CASINGS.
APPLICATION FILED JAN. 22, 1916.

1,218,155.

Patented Mar. 6, 1917.
2 SHEETS—SHEET 1.

Witnesses

Inventor
John F. Zimmerman,
By C. L. Parker.
Attorney

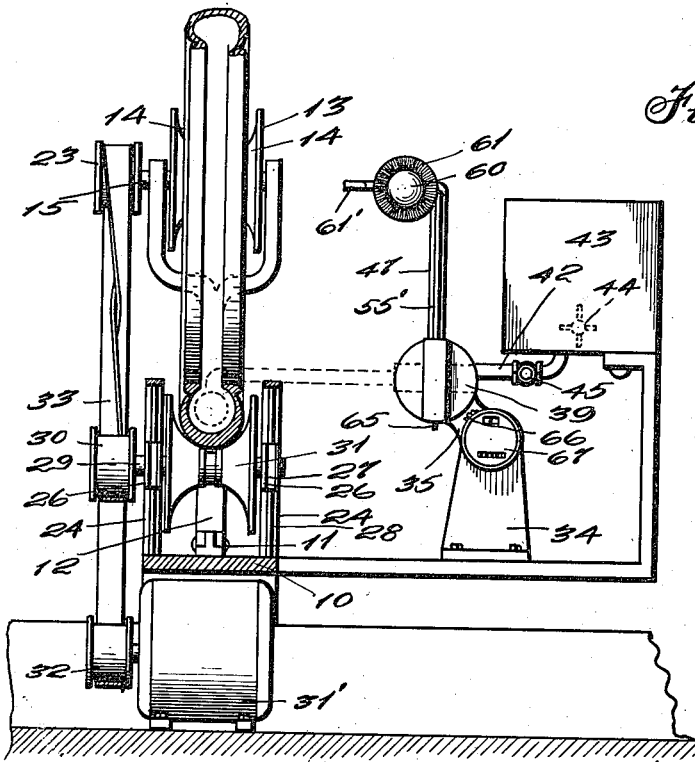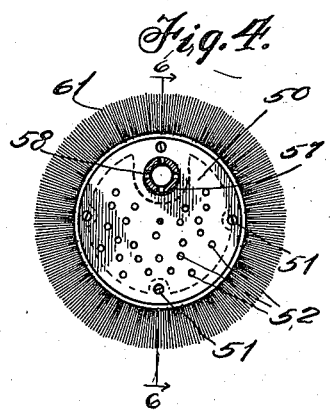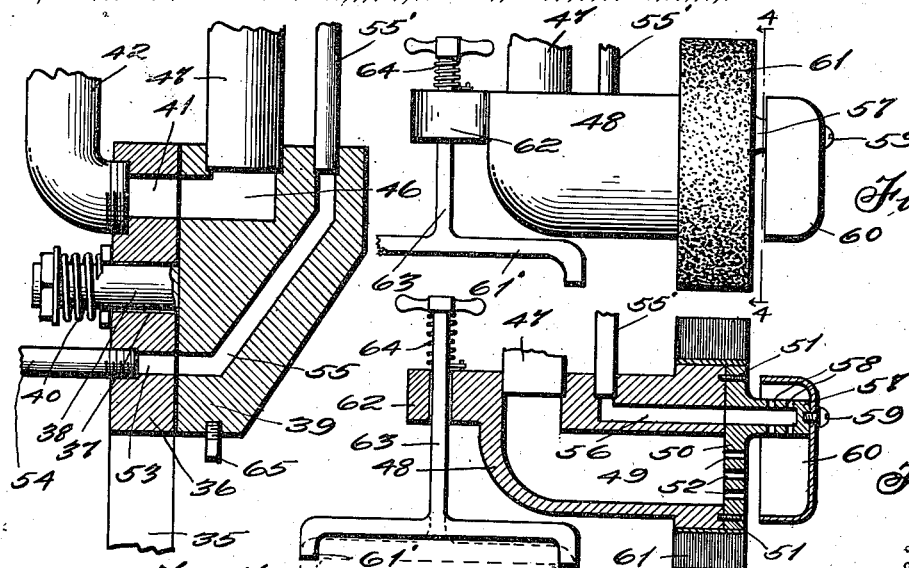

UNITED STATES PATENT OFFICE.

JOHN F. ZIMMERMAN, OF AKRON, OHIO.

MACHINE FOR PAINTING TIRE-CASINGS.

1,218,155. Specification of Letters Patent. Patented Mar. 6, 1917.

Application filed January 22, 1916. Serial No. 73,647.

*To all whom it may concern:*

Be it known that I, JOHN F. ZIMMERMAN, a citizen of the United States, residing at Akron, in the county of Summit and State of Ohio, have invented certain new and useful Improvements in Machines for Painting Tire-Casings, of which the following is a specification.

My invention relates to a machine for painting the inside of pneumatic tire casings or shoes.

An important object of the invention is to provide a machine of the above mentioned character, which will perform its work in a convenient and expeditious manner.

A further object of the invention is to provide a machine of the above mentioned character, which is adjustable for operating upon tires of different sizes.

A further object of the invention is to provide compressed air operated means for supplying paint to the interior of the tire casing.

A further object of the invention is to provide counting means for indicating the number of complete operations of the machine and painting individual tire casings.

Other objects and advantages of the invention will be apparent during the course of the following description.

Figure 1:
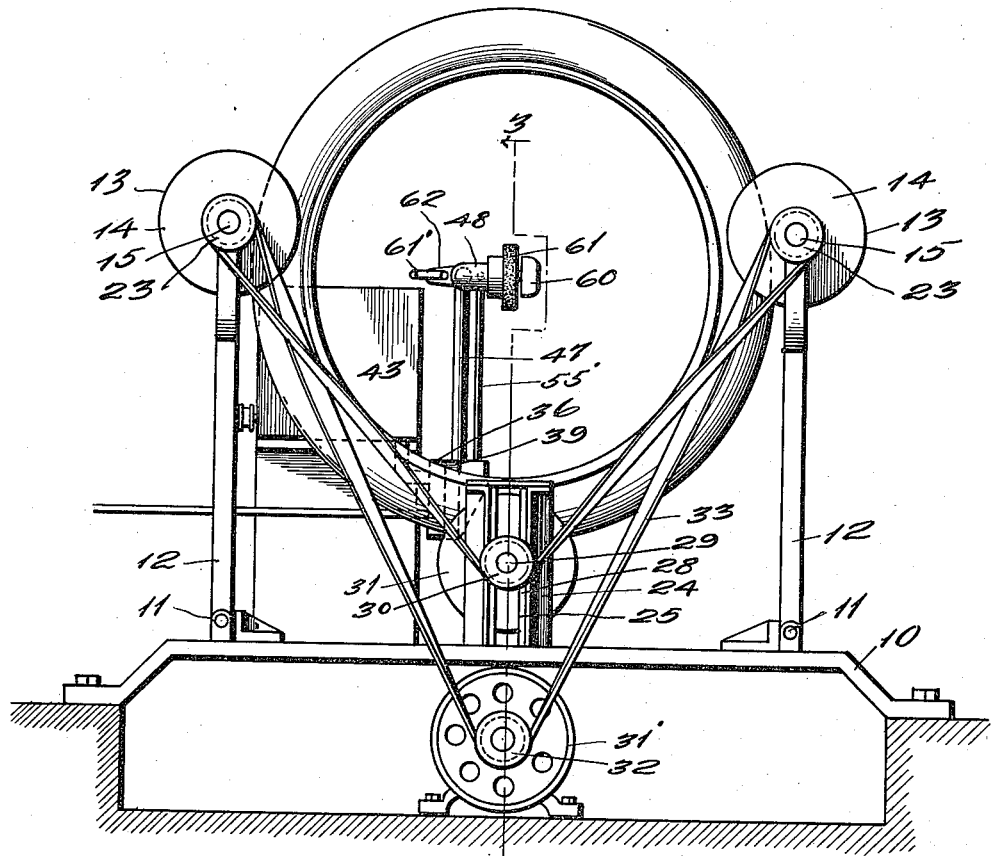
Figure 2:
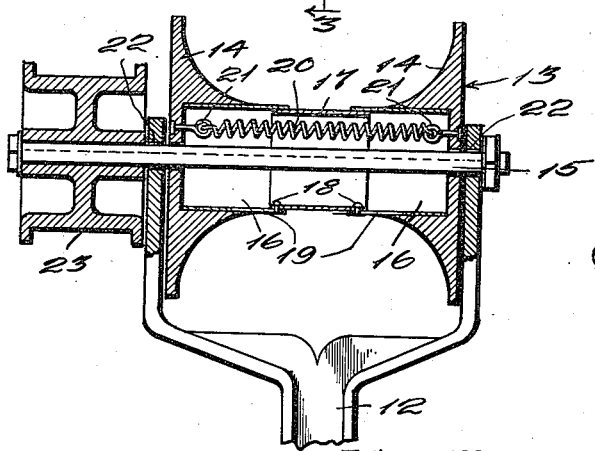

In the accompanying drawings forming a part of this specification and in which like numerals are employed to designate like parts throughout the same, Figure 1 is a side elevation of a machine embodying the invention, Fig. 2 is a longitudinal detail sectional view through a grooved tire casing supporting pulley, included in the machine, Fig. 3 is a transverse sectional view taken on line 3—3 of Fig. 1, Fig. 4 is a transverse sectional view taken on line 4—4 of Fig. 5, Fig. 5 is a side elevation of a brush, Fig. 6 is a sectional view taken on line 6—6 of Fig. 4, and, Fig. 7 is a detail section through a valve structure.

In the drawings wherein for the purpose of illustration is shown a preferred embodiment of my invention, the numeral 10 designates a preferably horizontally arranged base or foundation, upon which are pivoted, as shown at 11, preferably substantially vertically swinging arms 12. These arms have their upper ends forked, as more clearly shown in Fig. 2, receiving therein longitudinally adjustable tire casing supporting pulleys or spools 13. Each longitudinally adjustable pulley or spool 13 comprises pulley members 14, which are splined upon a shaft 15, as shown. Rigidly mounted within the pulley members 14 are sleeves 16, receiving a sleeve 17, telescoping therewith. The sleeve 17 preferably carries pins or rivets 18, operating within elongated slots 19, formed in the sleeves 16. The pulley members 14 are drawn toward each other by means of a retractile coil spring 20, attached thereto by eye bolts 21 or the like, as clearly illustrated in Fig. 2.

Each shaft 15 is rotatably mounted within openings 22 formed in the forked end of the arm 12 and the shaft is rotated or driven by a grooved pulley 23.

Arranged upon the base 10 between the arms 12 are upstanding preferably vertical guides 24, having longitudinal openings 25. Mounted for movement within these openings 25 are vertically movable bearings 26, having grooves 27 to receive ribs 28 formed upon the guides 24. Journaled through the bearings 26 is a shaft or spindle 29, to the outer end of which is rigidly secured a grooved pulley 30. Splined upon the shaft 29 is a longitudinally expansible or adjustable grooved or supporting wheel 31, which is identical with the pulley 13, and need not be again described in detail.

Located beneath the base or support 10 is a motor 31', or other prime mover, driving a grooved pulley 32, engaged by a belt 33. This belt is passed about the pulleys 23 and the pulley 30 and portions of the belt are crossed, as shown, whereby these pulleys are all driven in the same direction. It is obvious that these pulleys and belt may be arranged upon the opposite side of the machine, if desired, and the invention is of course in no sense restricted to their precise location.

Arranged forwardly of and near the base 10 is a pedestal or support 34, having a laterally extending arm 35, carrying a head or disk 36. This disk 36 is flat and is provided centrally thereof with an opening 37, pivotally receiving a trunnion 38 or other pivot element carried by a coacting disk 39. The trunnion 38 is preferably provided with a spring 40 serving to hold the disks 36 and 39 in firm sliding contact. The stationary disk 36 is provided preferably in its upper portion with a transverse port 41, having communication with a pipe 42 leading into a paint holding tank 43. This paint holding tank is preferably provided in its lower portion with agitating means 44, for maintaining the paint suitably mixed. A cut off valve 45 is preferably connected in the pipe 42. The coacting disk 39 is provided in its upper portion with an L-shaped port 46, adapted for movement into and out of registration with the port 41. Screw-threaded into the port 46 and hence rigidly attached to the disk 39 is a tubular arm or pipe 47. As more clearly shown in Figs. 5 and 6, this tubular arm or pipe 47 has a head or shell 48 rigidly attached thereto, and discharging into a chamber 49. The outer end of the head 48 is closed by a preferably circular plate 50, attached thereto by means of screws 51 or the like. The plate 50 is apertured as shown at 52.

The disk 36 is provided with a transverse air port 53, receiving compressed air from a pipe 54, having communication with any suitable source of compressed air (not shown). Adapted to coöperate with the port 53 is a compressed air supply port 55 formed through the coacting disk 39. The outlet end of the port 55 receives a pipe 55', extending parallel with the pipe 47, and leading into a port 56, formed in the head 48, as clearly indicated in Fig. 6. The port 56 extends through a boss 57, formed upon the plate 50, and this boss is provided with apertures 58 communicating with the port 56, as shown. Surrounding the boss and rigidly attached thereto, as shown at 59, is a bell-shaped hood or deflector 60. The numeral 61 designates an annular brush, which may be formed of bristles or wire or any other suitable material. This brush is rigidly attached to the head 48, adjacent the apertures 52, as clearly shown in Fig. 6.

Means are provided to open the tire casing or shoe to permit of the free and convenient entrance of the brush, the same comprising a pivoted and reciprocatory forked spreading member 61', mounted within a transverse aperture formed through a lug 62, carried by the head 48. The member 61 embodies a shank or spindle 63, carrying a coil spring 64, which serves to longitudinally move the member 61 and return it to the normal inner inactive position so that this member will not prevent the brush from contacting with the bottom of the tire casing.

As more clearly shown in Fig. 3, a pin 65 is attached to the disk 39 and adapted to contact with a star wheel 66, connected with and driving counting mechanism 67, serving to indicate the number of times that the brush has been moved to the horizontal position and returned to the vertical position, which takes place each time a tire casing is completely painted upon its interior.

The operation of the machine is as follows:

As shown in Fig. 1, the tire casing or shoe is arranged within and upon the supporting pulleys or spools 13 and 31. The arms 12 being pivoted, the pulleys 13 are adapted to swing inwardly or outwardly for accommodating different sizes of tires. The lower pulley 31 is adapted to rise and fall in accordance with the swinging movement of the pulleys 13 and this lower pulley by carrying the weight of the tire casing serves as tightening means for the belt 33. The pulleys 13 ordinarily engage with the tire casing above its center thus serving to move it downwardly. In this manner the tire casing is continually rotated. The brush head 48 is now swung toward the horizontal, and is brought in proximity to the tire casing. The spreading element 61' which is now parallel with the plane of rotation of the tire casing is inserted therein, and turned at approximately a right angle, whereby the tire casing is partly opened and further depression of the head 48 causes the brush 61 to enter the tire casing. When the brush 61 enters the tire casing and the pipe 47 is more or less horizontal, the ports 41 and 46 register and ports 53 and 55 register. The paint then passes into the head 48 and through the apertures 52, in the presence of the laterally discharging compressed air passing through the apertures 58. This paint is thus sprayed upon the brush 61 or the interior of the tire casing in proximity thereto. By the time the tire casing has made several complete revolutions, with the head 48 therein, it will be found that the interior thereof has been properly painted. The head 48 is then moved to the raised position and the motor 31' is stopped. The tire casing may be vertically elevated and removed from between the supporting pulleys.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a machine of the character described, a plurality of pulleys arranged to engage and support a tire casing, each pulley being grooved and longitudinally adjustable, and means for applying paint to the tire casing.

2. In a machine of the character described, a plurality of pulleys arranged to engage and support a tire casing, each pulley being grooved and longitudinally self-adjustable, means to drive one of the pulleys, and means to apply paint to the tire casing during its movement.

3. In a machine of the character described, a plurality of pulleys arranged to engage and support a tire casing, each pulley having end pulley members movable toward and away from each other and yielding means to move them toward each other, means to drive the pulleys, and means for applying paint to the tire casing during its movement.

4. In a machine of the character described, a lower pulley, upper pulleys arranged above and upon opposite sides of the lower pulley, pivoted supporting means for the upper pulleys, means to drive the pulleys, and means to apply paint to the tire casing.

5. In a machine of the character described, a grooved pulley, pivoted arms arranged upon opposite sides of the grooved pulley and adapted to swing in substantially the plane of rotation thereof, upper grooved pulleys carried by the arms, driving pulleys connected with the grooved pulleys to move them, a prime mover having a driving pulley, a belt engaging all of the driving pulleys, and means to apply paint to the tire casing.

6. In a machine of the character described, upstanding guides, a vertically movable grooved pulley carried by the guides, pivoted arms arranged upon opposite sides of the grooved pulley and adapted to swing in a plane substantially parallel to the plane of rotation of the grooved pulley, upper grooved pulleys carried by the pivoted arms, driving pulleys connected with the grooved pulleys to rotate them, a prime mover having a driving pulley, a belt engaging all of the driving pulleys, and means for applying paint to the interior of the tire casing.

7. In a machine of the character described, means for supporting and rotating a tire casing in an approximately vertical position, a support arranged near and upon one side of the means, an arm pivoted to the support to be swung in a substantially vertical plane so that its free end is adapted to be moved into and out of proximity to and from the tire casing, a brush carried by the arm and adapted to be moved into the tire casing, and automatic means to supply paint to the interior of the tire casing in proximity to the brush when said brush is moved within the tire casing.

8. In a machine of the character described, means for supporting and rotating a tire casing in an approximately vertical position, a support arranged near and upon one side of the means, an arm pivoted to the support to be swung in substantially a vertical plane so that its free end is adapted to be moved into and out of proximity to and from the tire casing, a head connected with the arm and having a paint receiving chamber and a compressed air supply port, a disk secured to the head and having apertures communicating with the paint receiving chamber and an apertured tubular boss communicating with the compressed air supply port, a deflector secured to the boss, a brush surrounding the head, and means to automatically supply paint into the paint receiving chamber and compressed air into the compressed air supply port when the brush assumes a predetermined position within the tire casing.

9. In a machine of the character described, as a sub-combination, a head having a paint receiving chamber and a compressed air supply port extending longitudinally thereof, a disk attached to one end of the head and having apertures communicating with the chamber and a tubular boss communicating with the port and provided with laterally extending ports, and a brush surrounding the head in proximity to the disk.

10. In a machine of the character described, as a sub-combination, a brush head carrying a brush, and a tire casing spreading element pivoted to the brush head.

In testimony whereof I affix my signature in presence of two witnesses.

JOHN F. ZIMMERMAN.

Witnesses:
 HARVEY MUSSER,
 T. W. KIMBER.